April 20, 1937. N. J. POUX 2,078,016
METHOD OF FORMING INTERLOCKING MEMBERS FOR SEPARABLE FASTENERS
Filed Aug. 7, 1933 8 Sheets-Sheet 1
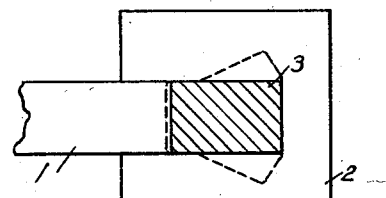
FIG.1.
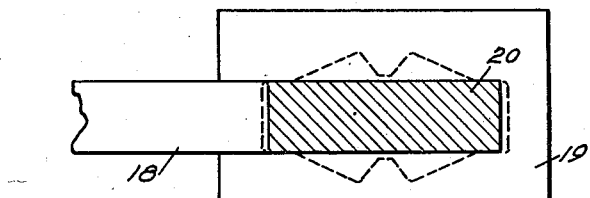
FIG.10.
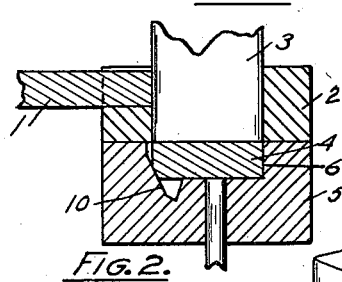
FIG.2.
FIG.3.
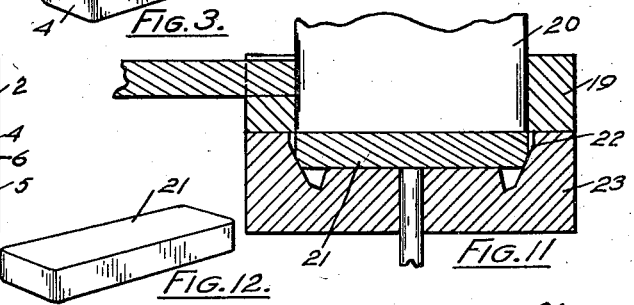
FIG.11.
FIG.12.
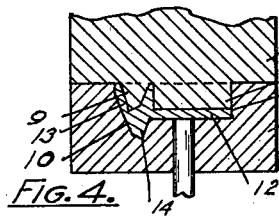
FIG.4.
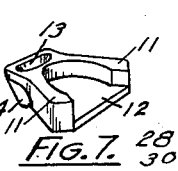
FIG.7.
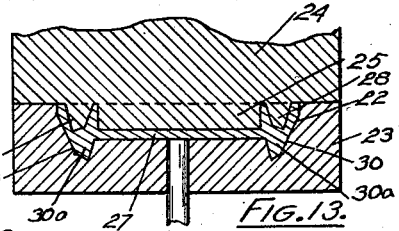
FIG.13.
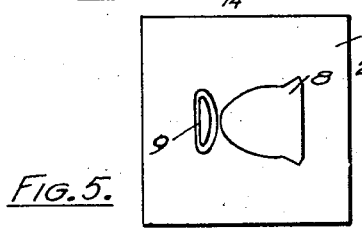
FIG.5.
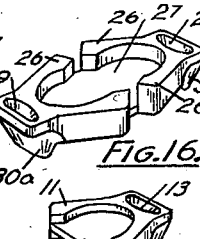
FIG.16.
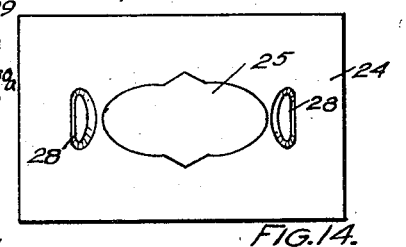
FIG.14.
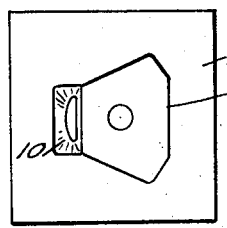
FIG.6.
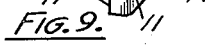
FIG.9.
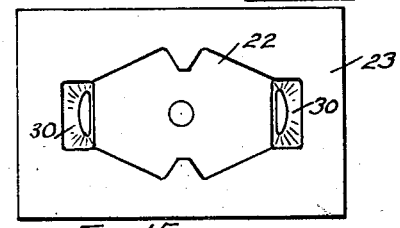
FIG.15.
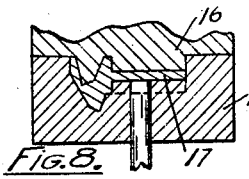
FIG.8.
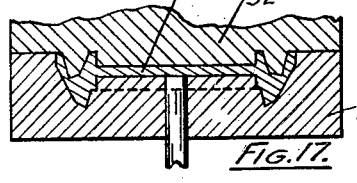
FIG.17.
INVENTOR.
Noel J. Poux
BY
ATTORNEYS.

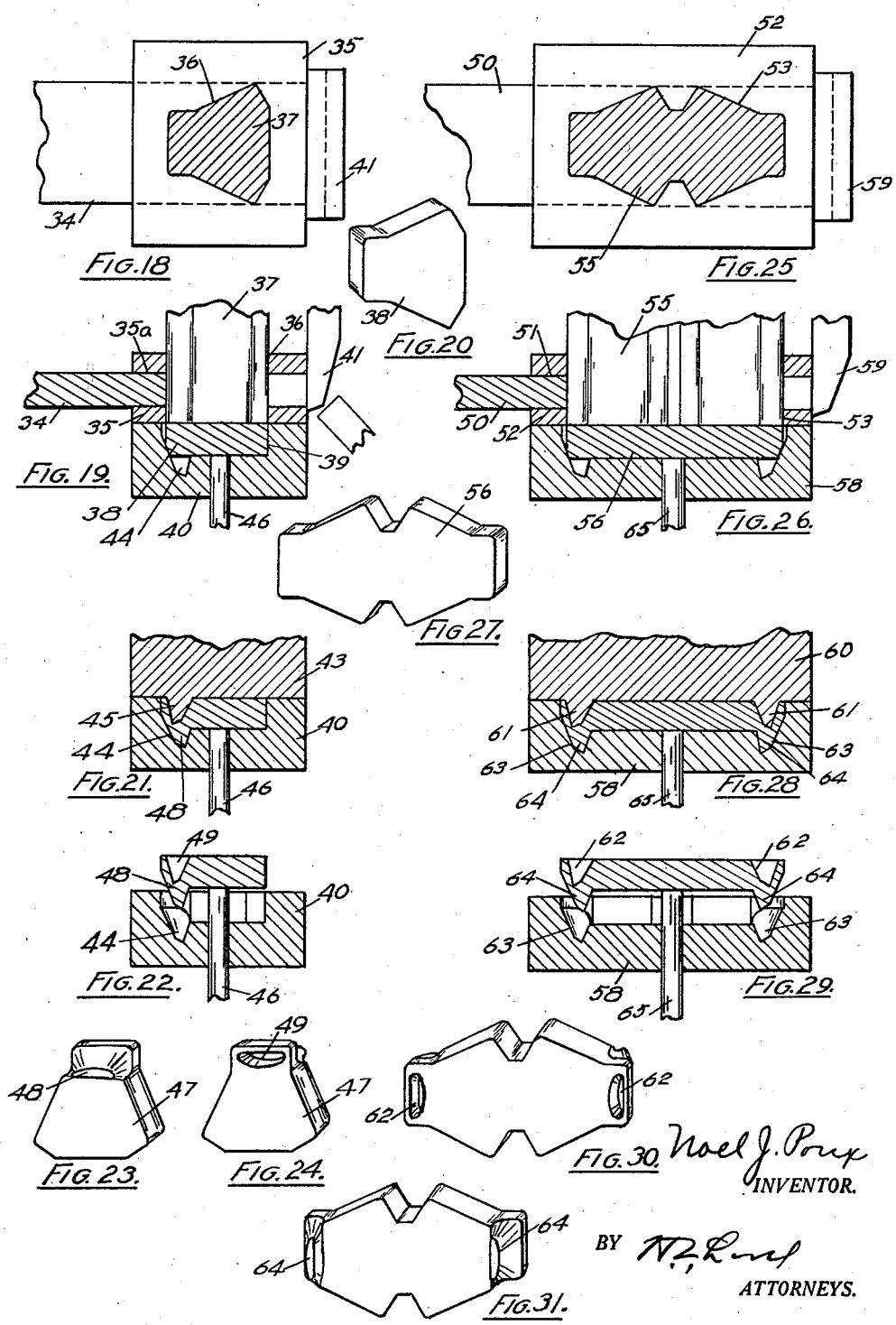

April 20, 1937.   N. J. POUX   2,078,016
METHOD OF FORMING INTERLOCKING MEMBERS FOR SEPARABLE FASTENERS
Filed Aug. 7, 1933   8 Sheets-Sheet 3
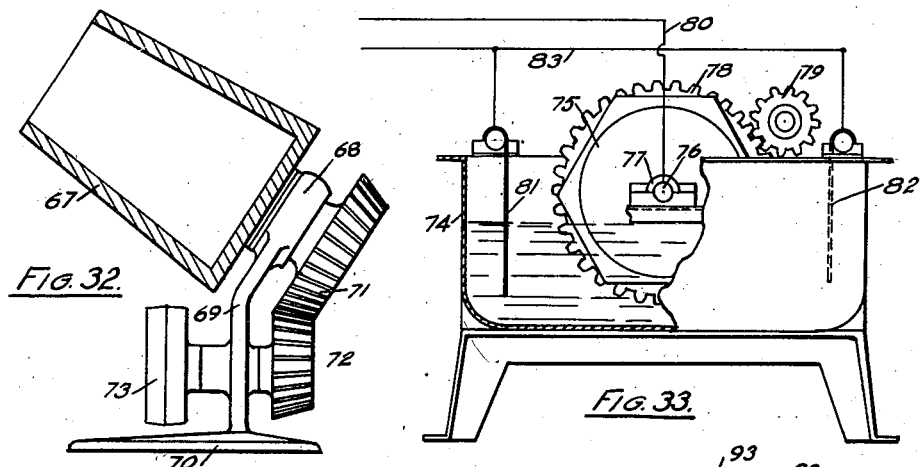
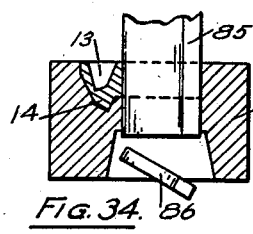
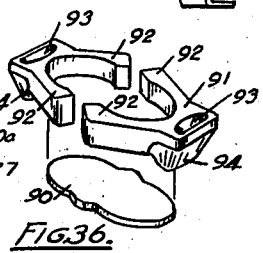
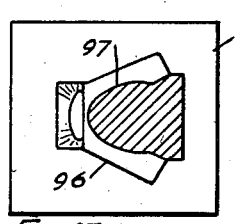
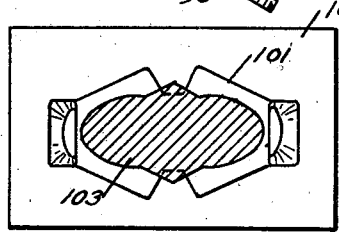
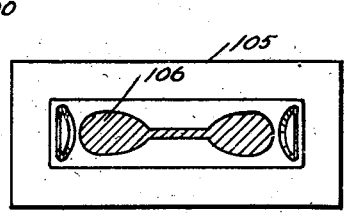
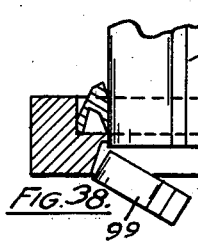
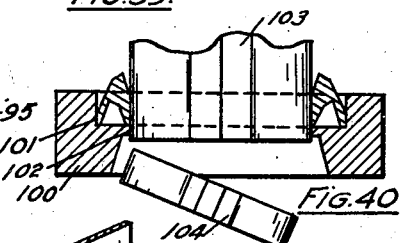
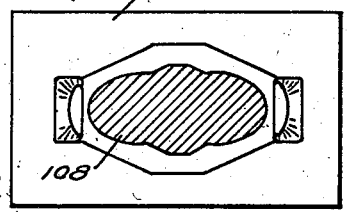
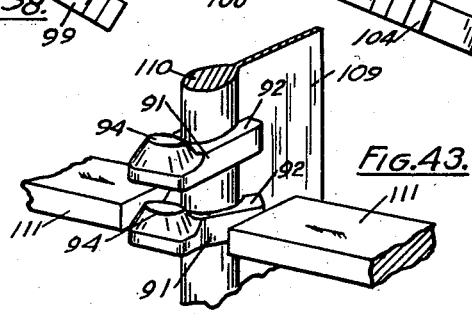
Noel J. Poux
INVENTOR.
BY
ATTORNEYS.

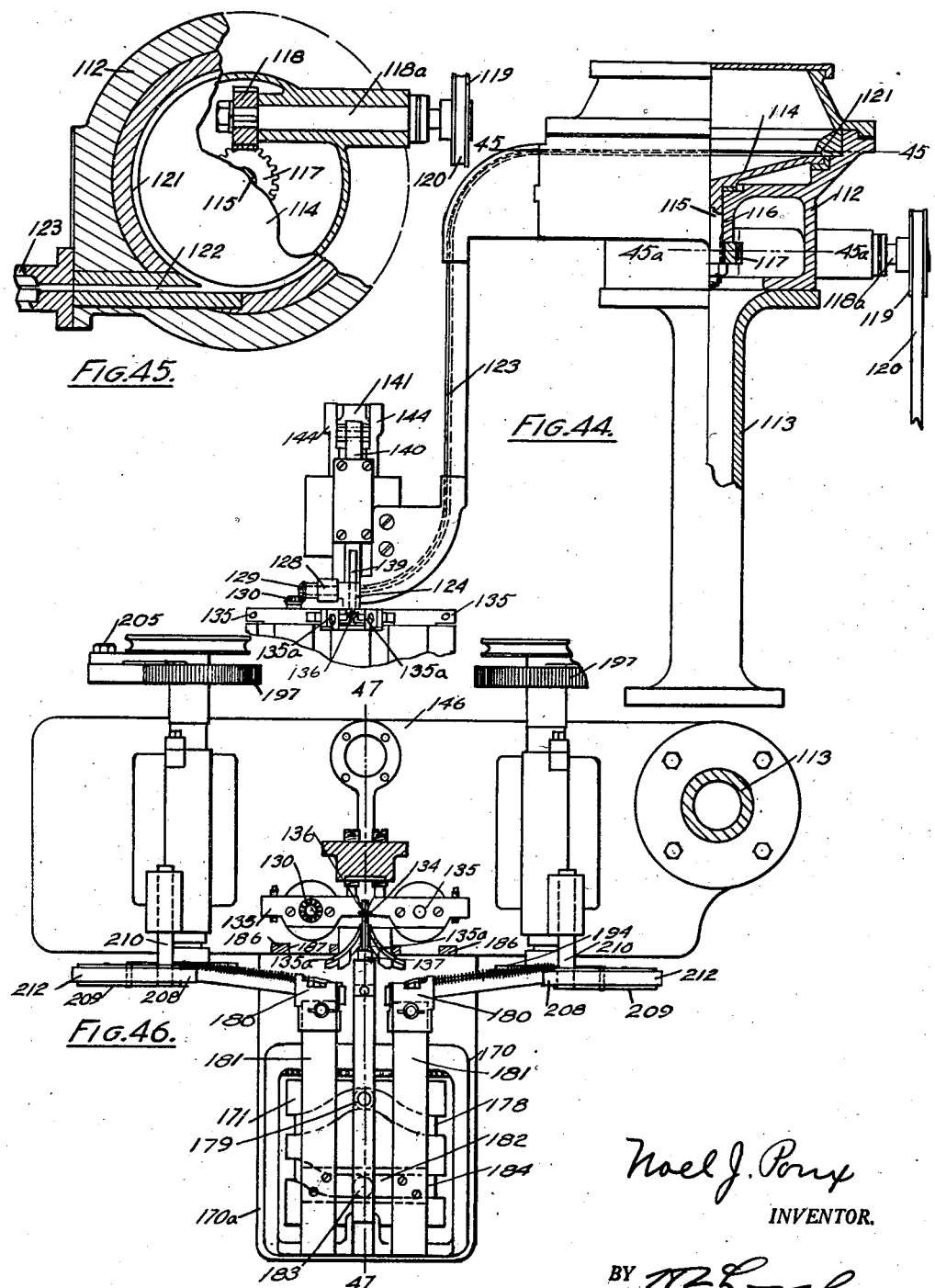

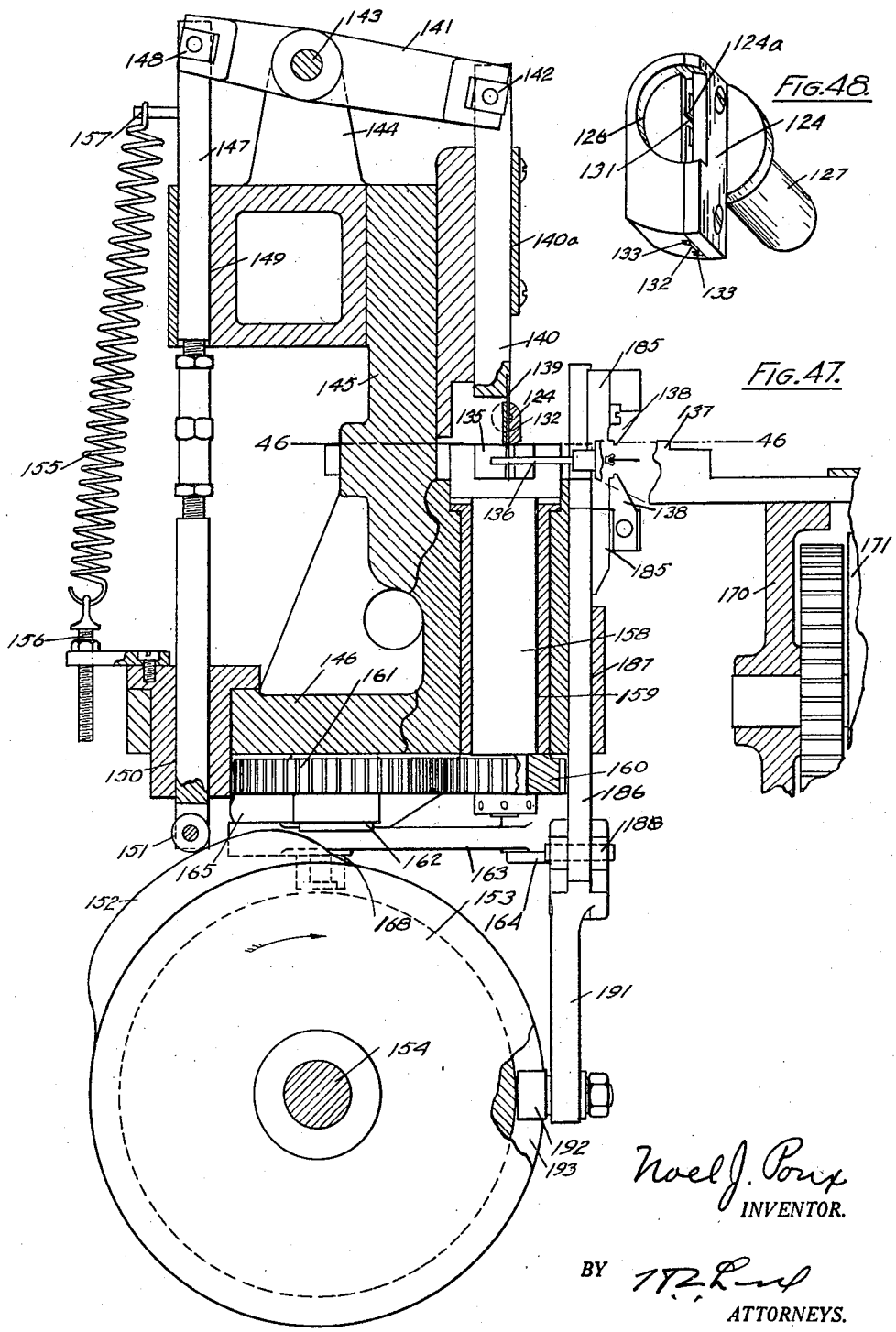

April 20, 1937.  N. J. POUX  2,078,016
METHOD OF FORMING INTERLOCKING MEMBERS FOR SEPARABLE FASTENERS
Filed Aug. 7, 1933  8 Sheets-Sheet 7
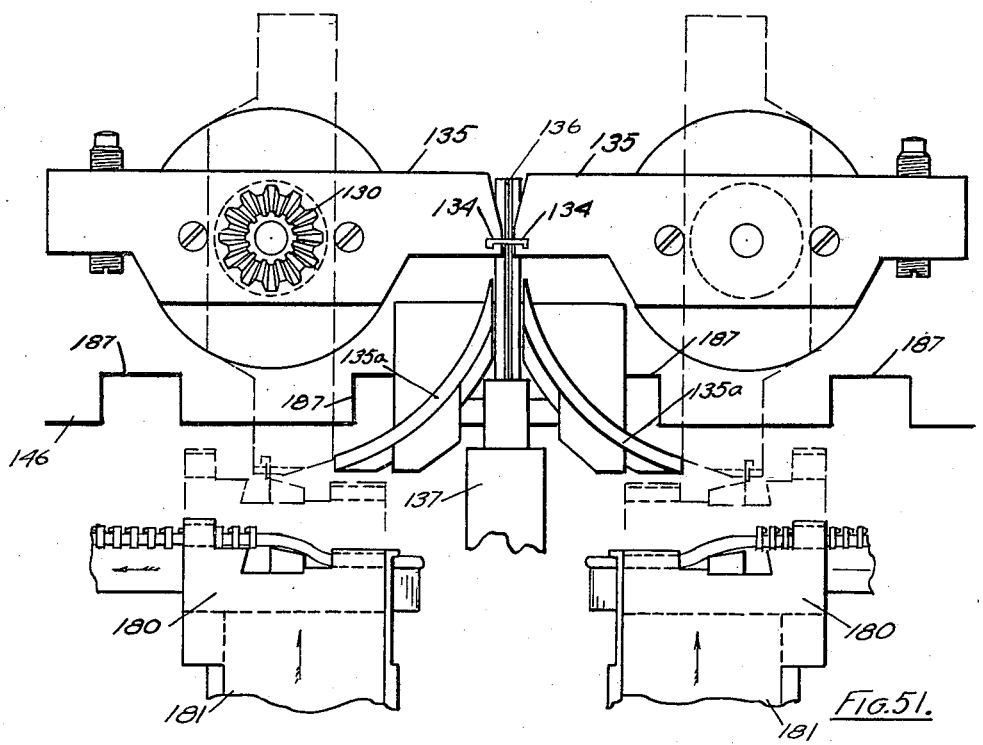
Fig.51.
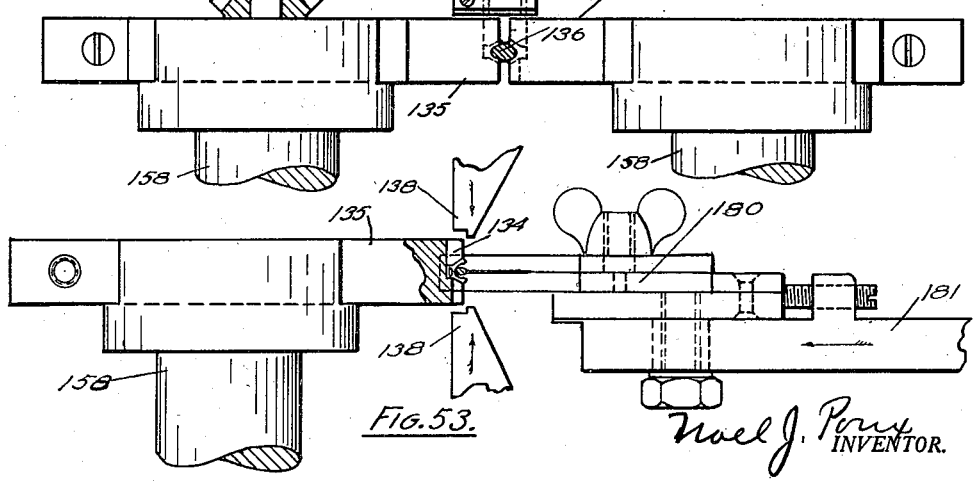
Fig.52.
Fig.53.
Noel J. Poux INVENTOR.
BY
ATTORNEYS.

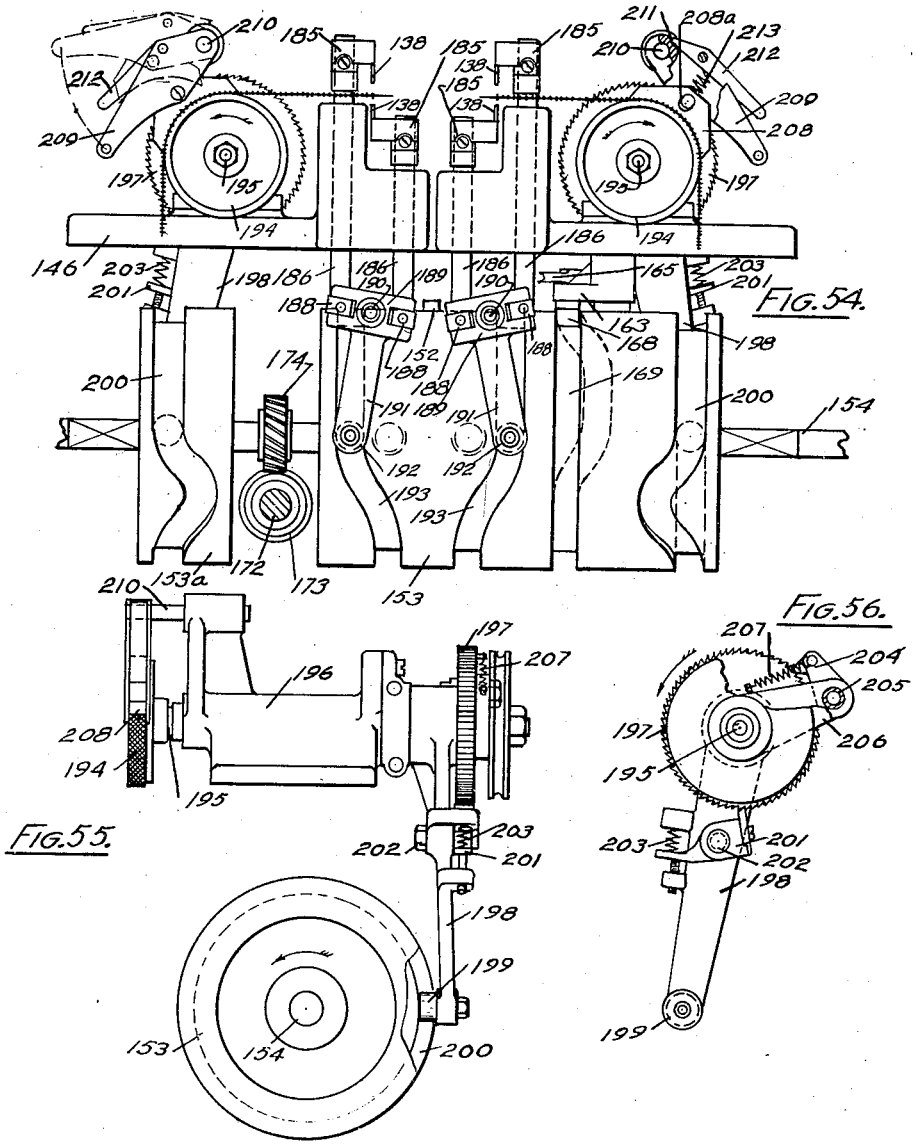

Patented Apr. 20, 1937

2,078,016

UNITED STATES PATENT OFFICE 2,078,016

METHOD OF FORMING INTERLOCKING MEMBERS FOR SEPARABLE FASTENERS

Noel Joseph Poux, Meadville, Pa., assignor to Hookless Fastener Company, Meadville, Pa., a corporation of Pennsylvania Application August 7, 1933, Serial No. 683,973

35 Claims. (Cl. 29—148)

The present invention is directed to an improved method of forming separable fasteners and particularly separable fasteners in which the interlocking members are provided with jaws which are clamped on stringers for securing the interlocking members in proper relation. The fasteners referred to involve the use of opposed stringers with opposed series of interlocking members which interlocking members are brought into and out of interlocking engagement through the action of a slider guiding the interlocking members into and out of interleaving position. Heretofore it has been common to form the interlocking members and while still retaining the members in the machine forming the members to carry them into position with relation to the stringers, or tape and to secure them in place on the tape. This method involves certain disadvantages. The forming of the interlocking members ordinarily leaves more or less burrs and where the operation carries the members and secures them to the tape these burrs must be removed with the members in place. The smoothing and processing, under these conditions, is rendered more or less difficult in that it is apt to injure the tape if the smoothing process is fully accomplished with relation to the interlocking members. In some instances also it is desirable to plate, or finish the interlocking members and where the interlocking members are formed and in the same continued operation placed on the tape this plating operation cannot be accomplished because the newly formed surfaces would not be finished, or plated. It has been suggested to form the interlocking members, finish them in an intermediate operation, and place them on the tape in a subsequent operation, but the open ends of the jaws of the interlocking members have made such suggestions impractical in that in endeavoring to select, or position the interlocking members for attachment on the stringers the jaws of the different members interfere with the rapid and convenient handling and have made the selection and placing of such members through a magazine and sorting apparatus impractical.

In the present method of this application these former disadvantages are obviated. The members are formed in a preliminary operation, but the metal is left between the jaws which closes, or bridges the open ends of the jaws and consequently prevents their bunching in an effort to select and sort them for positioning. In carrying out the invention, preferably two interlocking members are arranged end to end so that the open ends of the jaws are thus closed. With any method, however, of preventing open jaws, the units may be readily run through a sorting magazine and delivered to a machine which severs, or completes the opening in the jaws and which is adapted to place and secure the members on the stringers. Thus it is possible, after the formation of the interlocking members, except for the completion of the final severing of the jaws, or the metal in the jaws, to finish the outer surfaces of the members by a tumbling operation, to plate and process the surfaces in any manner desired, and then complete the jaws after the members have been selected or sorted in a magazine so as to form the interior surfaces of the jaws and place the members on the stringer. In some respects it is advantageous to actually complete the final forming of the interior of the jaws subsequent to any tumbling, or finishing operation in that such final finishing of the jaws gives a more definite engaging surface and assures a more definite engagement on the tape. Further features and details will appear from the specification and claims.

A preferable manner of practicing the invention is illustrated in the accompanying drawings as follows:—

Fig. 1 shows a plan view of a blanking die for forming single members.

Fig. 2 a central section through the die.
Fig. 3 a perspective view of the blank.
Fig. 4 a central section of a forming die.
Fig. 5 a plan view of a forming punch.
Fig. 6 a plan view of the forming die.
Fig. 7 a perspective view of one of the members as completed by the forming die.
Fig. 8 an alternative arrangement of forming dies.
Fig. 9 a member as delivered by the alternative dies.
Fig. 10 a plan view of a blanking die for forming double members.
Fig. 11 a central vertical section through the die.
Fig. 12 a perspective view of the blank.
Fig. 13 a central section showing the forming die.
Fig. 14 a plan view of the forming punch.
Fig. 15 a plan view of the forming die.
Fig. 16 a perspective view of the double members as they come from the forming die shown in Fig. 13.
Fig. 17 a vertical section of an alternative form of forming dies.
Fig. 18 a plan view of a blanking die for a single member showing an alternative manner of forming the same.

Fig. 19 a vertical section of the blanking dies.

Fig. 20 a perspective view of the blank.

Fig. 21 a vertical section of forming dies.

Fig. 22 a vertical section showing the discharge of the forming dies.

Fig. 23 a perspective view of one of the blanks formed by one of the forming dies showing the projection side of the member.

Fig. 24 a perspective view showing the recessed side of the member.

Fig. 25 a plan view of a blanking die for a double member in a manner similar to the formation of the single member shown in Figs. 18 to 24.

Fig. 26 a vertical sectional view of the dies shown in Fig. 25.

Fig. 27 a perspective view of the blank formed in the blanking dies of Figs. 25 and 26.

Fig. 28 a vertical sectional view of a forming die for completing the blank shown in Fig. 27.

Fig. 29 a vertical section showing the discharge of the double-formed blank.

Fig. 30 a perspective view of the recessed side of the double members.

Fig. 31 a perspective view of the projection side of the double members, formed by the forming die of Fig. 28.

Fig. 32 shows a tumbling barrel for smoothing the members formed in the different methods illustrated in the preceding figures.

Fig. 33 an elevation of a plating barrel.

Fig. 34 shows a central section through the die completing the interior of the jaws of a single member formed as indicated in Figs. 1 to 8 after they have been finished in the tumbling operation.

Fig. 35 a similar view for forming the interior surfaces of the jaws and severing the jaws of a double member, formed as illustrated in Figs. 10 to 15.

Fig. 36 a perspective view of the severed members.

Fig. 37 shows a plan view of a die for finishing the inner surfaces of the jaws of a single member formed in the manner illustrated in Figs. 18 to 24.

Fig. 38 a perspective view of the dies shown in Fig. 37.

Fig. 39 a plan view of a die for forming the interior surfaces of the jaws and severing the double members formed in the manner illustrated in Figs. 25 to 31.

Fig. 40 a sectional view of the dies shown in Fig. 39.

Fig. 41 shows an alternative method of forming the members.

Fig. 42 a plan view of a die supplementing the operation of the die of Fig. 41.

Fig. 43 shows a perspective diagrammatical view of a manner of attaching the members as finally formed on a stringer.

Fig. 44 shows an elevation, partly in section, of a magazine for sorting and selecting the members, placing the same in a die for severing the completed members.

Fig. 45 a plan view of a magazine, a part being in section on the line 45—45 in Fig. 44 and a part in section on the line 45a—45a in Fig. 44.

Fig. 46 a section on the line 46—46 in Fig. 47.

Fig. 47 a vertical section on the line 47—47 in Fig. 46.

Fig. 48 a perspective view of the member positioning head.

Figure 49:
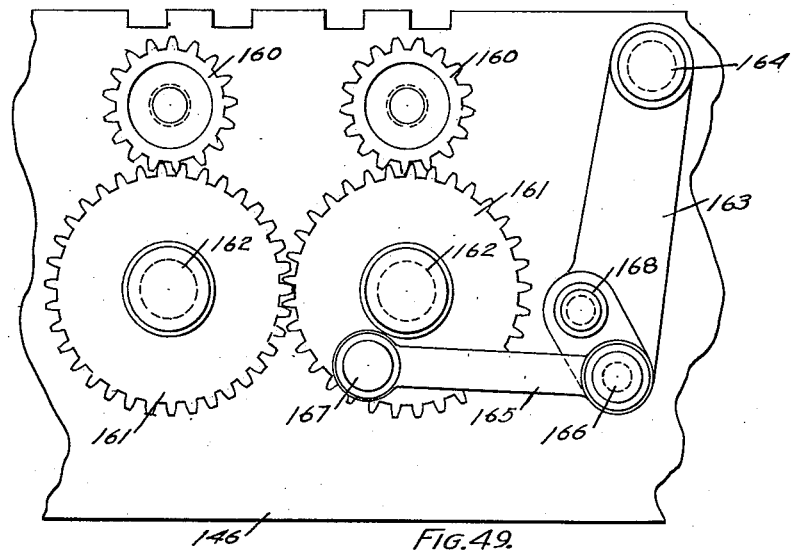

Fig. 49 a bottom view of the driving mechanism for the jaw forming dies.

Figure 50:
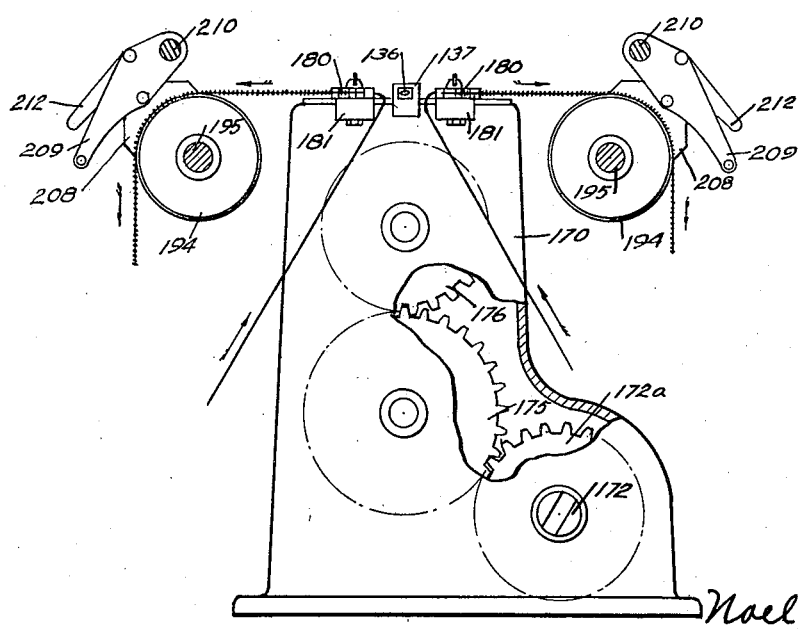

Fig. 50 a front view of a portion of the machine showing the tape feeding mechanism.

Fig. 51 an enlarged view of the jaw forming dies and tape guides.

Fig. 52 an enlarged view of the interlocking member positioning devices.

Fig. 53 an enlarged view showing the jaw forming dies in position to place the member on the tape and in relation to the jaw forming plungers.

Fig. 54 a view of the cam mechanism for feeding the tape operating the jaw closing plungers and actuating the jaw punch die heads.

Fig. 55 a side elevation of the tape feeding mechanism.

Fig. 56 a detached view of the ratchet devices of the tape feed mechanism.

Considering the manner of forming the single members illustrated in Figs. 1 to 7, a strip of sheet metal, or wire, 1 is fed into a blanking die 2. A plunger cuts off a length of this strip. The strip 1 is of the width of the final interlocking member. A punch 3 drives a blank 4 into a die socket 6 of the forming die 5. The forming die 5 is brought under a forming die plunger 7 and this has a jaw forming coining projection 8 having the outline of the interior of the jaws and the die socket 6 has the outline of the exterior of the jaws so that the coining operation forms the interior and exterior of the jaws in a spread position. The jaws 11 are thus formed in this coining operation. Preferably there is left a web 12 between the jaws so that the individual members may be readily handled and sorted in a magazine in after operations. The forming plunger 7 has a recess forming extension 9 which forms a recess 13 in the interlocking member and the die 5 has a projection forming recess 10 in which a projection 14 is coined. The only difference in the alternative form shown in Figs. 8 and 9 is that the die 15 and plunger 16 are formed to provide a web 17 between the jaws midway of the walls of the jaws instead of at one side of the jaws as in Fig. 7.

In Figs. 10 to 15 a strip 18 is fed into a blanking die 19. Here again the strip 18 has the width of the final member. A blanking punch 20 severs an end of the strip forming a blank 21 and this blank is forced into a forming socket 22 of a die 23. It will be noted that the blank is of sufficient length to form two members. The forming die 23 is brought under a forming punch 24 and this is provided with a jaw forming and coining extension 25. The walls of the die socket 22 have surfaces giving the exterior shape of the jaws as shown in Fig. 15, so that as the plunger advances the metal forming the jaws 26 is forced to flow to the outline of the die socket 25 and form the outer surfaces of the jaws in spread position. The extension leaves a web 27 between the jaws and the web also unites the two members. The plunger is also provided with extensions 28 for forming recesses 29 and the die 23 is provided with recesses 30 for forming projections 30a on the members.

In the alternative form indicated in Fig. 17 the die and plungers 31 and 32 are arranged to provide a web 33 midway between the faces of the members as distinguished from one face of the members, as indicated in Fig. 16.

In the method of forming the single members illustrated in Figs. 18 to 24, the strip 34 is of the width of the outer edges of the spread jaws and this strip is fed into a blanking die 35 having a guide-way 35a and a blanking outline 36. A plunger 37 forms a blank, as shown at 38, and forces this blank into a die socket 39 of a die 40. With a downward movement of the plunger a cutter 41 severs the waste from the strip so that the strip may be indefinitely advanced. The forming die 40 is brought under a forming punch 43, the die having a projection forming recess 44 and the punch a recess forming extension 45. The blank so formed is ejected by an ejector 46, as shown in Fig. 22, and the final blank as coming from this forming die is shown in Figs. 23 and 24 in which the jaw portion 47 has the exterior shape of the jaws formed but leaves the material unremoved from the interior of the jaws. The members are provided with projections 48 and recesses 49.

A manner of forming double member blanks is illustrated in Figs. 25 to 31. In this alternative method a strip 50 of the ultimate width of the spread jaws is fed into a guide slot 51 of a blanking die 52 which has a blanking outline 53 of the exterior of two members with the jaws spread. A plunger 55 forces a blank 56 into a die socket 57 in a die 58. Here the scrap is also severed by a shear 59. The forming die 58 is carried under a forming punch 60 having extensions 61 for forming recesses 62 in the blank and the die 58 has recesses 63 for forming projections 64 on the members. The forming blank is ejected by an ejector 65 as shown in Fig. 29 and the completed blank is shown in Figs. 30 and 31.

The blanks as formed in any of the preceding alternative manners may be then finished by a tumbling process, the tumbling apparatus being shown in Fig. 32. This involves the usual tumbling barrel 67 journaled at 68 on a post 69, the post extending from a base 70. The barrel is driven through gears 71 and 72 from a driving pulley 73 in the usual manner. In this way the burrs and outer surfaces of the members may be given a finish in a very economical manner.

During this finishing operation the major portion of the exterior edges of the member is unobstructedly exposed.

The members may be further finished in a barrel plating apparatus shown in Fig. 33. Here a tank 74 has a plating container 75. This is mounted on a shaft 76 journaled in a bearing 77. The container has a gear 78 meshing with a pinion 79. The container 75 acting as the cathode receives current through a wire 80 and the cathodes 81 and 82 receive current from the wire 83. Thus the members may be plated, or otherwise coated, as desired.

After the finishing method, the interior of the jaws is completed and where double blanks are formed the interior of the jaws is formed and the members severed. This is shown in outline in Fig. 34 where a single member, such as shown in Fig. 7, is placed in a die 84 and the interior of the jaws formed by a punch 85 which severs and removes the material 86 which had formed the web 12. The double member, as indicated in Fig. 16, may be similarly treated by being placed in a die 87, a plunger 89 finishing the interior of the jaws of the two members of the blank and severing the members of the blank along the die surfaces 88 and the material 90 removed including the web 28. So there is provided as a resultant of the step illustrated in Figs. 34 and 35 interlocking members 91 having open jaws 92 and recesses 93 adapted to receive projections 94 on the opposite face. The blank as formed in the manner illustrated in Figs. 18 to 24 may have the jaws completed after the tumbling and finishing, as indicated in Figs. 37 and 38 wherein the blanks such as indicated in Figs. 23 and 24 are placed in a die 95 having walls 96 conforming to the exterior of the member and having blanking surfaces 97 following the outline of the interior of the jaws. A plunger 98 removes the interior metal 99, the final member being shaped as is the member 91 in Fig. 36. The blank formed as indicated in Figs. 30 and 31 may be after tumbling and finishing, completed by placing in the die 100 having outlining walls 101 conforming to the outer shape of the member and blanking walls 102 conforming to the shape of the interior of the jaws, and shaped to sever the two members. A plunger 103 removes the material from the interior of the jaws and severs the ends of the jaws by blanking out a plate 104. Here this results in a finished member, as 91, as indicated in Fig. 36.

In Figs. 41 and 42 an alternative manner of forming the dies is indicated in which the jaws are first blanked of a width of the final member and with the jaws in closed position. This is accomplished by a die 105 and plunger 106, as shown in Fig. 41. The blank so formed is then placed in a die 107 and the jaws spread by a plunger 108. In the further operation of this blank it is merely necessary to sever the jaws of the two members for the final operation in the manner hereinafter shown.

In Fig. 43 there is shown diagrammatically the manner of placing the jaws on the tape. Here the tape 109 receives the jaws 92 of the interlocking members 91, the tape being provided with a bead, or rib 110 for more definitely securing the members. The jaws are closed on the tape by closing plungers 111.

One of the outstanding advantages of this method is in the fact that the tumbled, or otherwise finished member blanks, by reason of the fact that the open ends of the jaws are bridged, may be readily selected and guided to complete the jaw operation and place the same on the tape. Where this operation is attempted with open jaws the members form in bunches, the jaws inter-engage in a manner that makes the proper selecting and sorting impractical. I have shown (Figs. 44 to 46) a means whereby the member blanks, both single and double, having their jaws closed may be sorted and guided and have the jaws completed and the members severed and placed in proper relation upon a tape. This is preferably accomplished by a machine. The members are placed in a magazine 112, the magazine being carried by a standard 113. The magazine involves a rotating platform 114 which is provided with a spindle 115 carried in a bearing 116. The spindle has a gear 117 at its lower end which is driven by a gear 118, the gear 118 being driven from a shaft 118a. The shaft 118a is driven by a pulley 119 from a belt 120 leading to any convenient part of the machine. The speed of the platform 114 is such as to throw the members thereon centrifugally to the outer edge and a selecting and guiding groove 121 is arranged along the edge. The groove 121 leads to a tangential discharge groove 122 which is so shaped as to permit the entrance of blank members where the projections are proper side up, but does not receive members with projections otherwise arranged and under these conditions the members themselves not properly selected pass by the tangential groove and mingle with the material in the magazine. There are, therefore, readily selected a series of blanks and these are carried properly directioned and positioned into the discharge, or tangential groove 122. From this they are moved through a guiding groove 123 to a positioning member 124.

The positioning member is shown in enlarged perspective view in Fig. 48. A groove 124a extending axially of the positioning head 124 receives the blank members endwise. The head has a socket 126 into which the guide 123 extends so as to maintain a proper register with the groove 124a. The head has a spindle 127 and this spindle is carried in a bearing 128. A beveled gear 129 is arranged on the end of the spindle and this meshes with a gear 130. These gears rock with a jaw forming die head in a manner hereinafter described. Suffice to say that they oscillate the positioning head 90°. The groove 124a has an extension 131 which permits the entrance of the projections. The members are received in a horizontal plane and by the rotation of the positioning head are turned to a vertical position and they are then forced through a groove 132 in the head which extends radially from the groove 124a, the groove 132 having extensions 133 for permitting the movement of the projections.

The member blanks as they are ejected from the positioning head in a manner hereinafter described are forced into the jaw forming dies shown in the enlarged view, Fig. 51, these dies having the die sockets 134 carried by heads 135. There are two of these heads and a part of the die is formed in each head where the blanks are formed for double members. Where the blanks are formed for only a single member only one head is required. A punch 136 carried by a punch bar 137 is advanced through the die 134 and removes the material of the interior of the jaws and severs the blanks and this is accomplished regardless of whether the blanks are formed with the webs, or with the full thickness of material between the jaws, or whether there are merely connected jaws. In any case the interior of the jaws is formed and the members severed by the punch 136. The heads 135 are then rotated 90° to the dotted position of Fig. 51 and this brings the open jaws of the members held by the dies into relation to receive the edges of the tapes as they are forced forward by the tapes' guides, the tape being fed forward into position between the jaws by a mechanism hereinafter described. With the tapes in this position, the jaws are closed by the closing plunger 138 (see Fig. 53). Means are provided by which tapes are advanced for each operation. Where there are double members, therefore, two lines of tape are provided and the tape doubles the capacity where single members are formed. The severed members are held in the dies as the die heads swing by the punch and guides 135a.

The mechanisms for accomplishing these several features are as follows: A push plate 139 is carried by a reciprocating bar 140 which is slidingly mounted in a bearing 140a. The plate 139 is designed to enter the slot 132 and force the member blank through the slot 132 and into the die 134 so that the member is definitely and properly seated in the dies 134 by the plate. A rock arm 141 is connected by a bearing 142 within the bar 140. It is pivotally mounted on a pin 143, the pin being mounted in ears 144, the ears extending from a post 145. The post is formed on a frame 146 of the machine. A thrust bar 147 is connected by bearings 148 with the rocker 141. The thrust bar is slidingly mounted in bearings 149 and 150 and is provided with a cam roller 151 at its lower end. The cam roller is in the path of a cam 152 and this cam is properly timed to give to the plate 139 a feeding movement. The cam 152 is mounted on a cam cylinder 153. This cam cylinder is driven by a drive shaft 154 from which the machine receives its energy. A spring 155 anchored at 156 on the frame and on a pin 157 on the thrust bar 147 returns the thrust bar and consequently the feeding plate 139 after each operation. The jaw forming die heads 135 are each mounted on a spindle 158 and these spindles are mounted in bearings 159 in the frame. Gears 160 are fixed on the lower ends of the spindles 158 and these gears each mesh with gears 161. The gears 161 mesh with each other (see Fig. 49) so that the heads driven through these gears are rotated in opposite directions. The gears 161 are mounted on studs 162. A rock arm 163 is journaled on a stud 164 on the frame. A link 165 is connected with the arm by a pin 166 and with one of the gears 161 by a pin 167. The rocker 163 is provided with a cam roller 168 which operates in a cam groove 169 on the cam cylinder 153. Through this cam action the gears 161 are rocked sufficiently to turn the gears 160 90° and consequently the die heads 135 90° to transfer the members in the dies 134 from the punching position shown in Fig. 51 to the tape securing position shown in dash lines in Fig. 51.

A cam box 170 is arranged in the front of the machine. It is carried by a bracket 170a extending from the machine. A cam cylinder 171 is journaled in this box. A shaft 172 extends from the box to a position under the drive shaft 154. A gear 173 is fixed on the shaft 172 and meshes with a gear 174 on the drive shaft. A gear 172a is fixed on the shaft 172 and meshes with a gear 175 arranged in the box 170. The gear 175 meshes with a gear 176 and the gear 176 is fixed with the cam cylinder 171 so that the cam cylinder 171 is driven in step with the rest of the machine. The cam cylinder has a cam groove 178 and a cam roller 179 is arranged on the bar 137 and extends into this cam groove. In this way the punch bar is reciprocated forward and back in proper time to punch the jaws and sever the blank.

Tape guides 180 are mounted on reciprocating bars 181 which extend into guide slots in the box 170. A cross bar 182 is secured to both of the bars 181 and a cam roller 183 is arranged at the center of the cross bar 182 and extends into a cam groove 184 so that the two tape guides are advanced and withdrawn with each cycle of the machine through the action of this cam. As the die heads 135 are swung around carrying the open ended jaws into position facing the tape, the tape is advanced carrying the tape between the jaws and the jaw closing plungers are closed, thus securing the jaws on the tape. The jaw closing plungers 138 are mounted on the heads 185. These heads are carried by sliding bars 186, the bars being mounted in guides 187. The bars 186 have bearings 188 by which they are connected to rockers 189. The rockers are journaled on pins 190 and have arms 191 terminating in cam rollers 192. The rollers operate in cams 193 on the cam cylinder 153. These cams give to the jaw closing plunger a reciprocating motion timed with relation to the positioning of the interlocking members astraddle the edge of the stringer, or tape.

The tape is advanced step by step so as to properly space, or position the members thereon. Each of the tapes is carried over a feed roll 194. The two feed rolls are exactly alike and a description of one would apply to both. The feed roll 194 is carried by a spindle 195 journaled in a bearing 196. A ratchet wheel 197 is fixed on the outer end of the spindle 195 and a rock arm 198 is journaled on the end of the bearing 196 concentrically with the spindle. The rock arm has a cam roller 199 at its lower end which operates in a cam groove 200 in the cam cylinder 153, or 153a. A pawl 201 is pivotally mounted by a pin 202 on the arm 198. A spring 203 yieldingly crowds the pawl into engagement with the ratchet wheel 197. A pawl 204 is pivotally mounted by a pin 205 on a stationary arm 206. The pawl is urged into engagement with the ratchet wheel by a spring 207 and this pawl prevents a return movement of the ratchet wheel during a return movement of the pawl 201. With each cycle of the machine the cam drives the rock arm 198 and advances the ratchet wheel the space that may be desired. The tape as it passes from the feed wheel 194 is held in engagement therewith by a pressure shoe 208. This shoe is pivotally mounted in an arm 209 by a pin and slot 208a and the arm is pivotally mounted on a pin 210. The end of the pin has a notch 211 adapted to engage a pawl 212. A spring 213 operates between the pawl 212 and the shoe 208 and exerts spring pressure on the shoe 208. By depressing the pawl 212 it is moved out of the catch 211 and permits the lifting of the shoe out of engagement.

From this it will be seen that a partly formed blank is provided by one of the methods illustrated, either by a coining operation which spreads the material in a narrow strip to form the jaw, or by using a broader strip and fanning the jaws outlined by a stamping operation and that the partially formed members in each instance have the space between the jaws bridged so that the bunching of the members is avoided in their subsequent handling. This permits of smoothing the articles by tumbling, or other means and in finishing the articles by plating, or coating, as may be desired. The bridged jaws permit of easy hoppering and selecting of the devices so that they may again be placed in the control of guiding and advancing means of a machine. In passing through this the members are guided to a position where the interior of the jaws is formed and if the partially forming blank is double the two members are severed. Without losing the control of the devices they are placed in position on a stringer, the jaws closed and the stringer advanced for proper spacing.

The method involves, therefore, an economical manner of partially forming the members, an economical manner of finishing and treating the members and an economical plan of placing and securing them in proper spaced relation on a stringer.

What I claim as new is:—

1. The method of forming interlocking members for separable fasteners, which consists in forming separate units of partially formed members with attaching jaws and with material bridging the space between the ends of the jaws, selecting and maintaining in controlled relation the units of partially formed members, and removing by punching, while under said control, the material bridging the space between the ends of the jaws to complete the individual members.

2. The method of forming interlocking members for separable fasteners, which consists in partially forming the members with attaching jaws and with material bridging the space between the ends of the jaws, treating said partially formed members to change some surface characteristic thereof, selecting and maintaining in controlled relation the partially formed members, and removing by punching, while under said control, the material bridging the space between the ends of the jaws and the material between the intermediate portions of the jaws.

3. The method of forming interlocking members for separable fasteners, having attaching jaws and interlocking devices at the opposite ends of the members, which consists in providing a strip of less width than the member with spread jaws; coining the jaw ends of the members forcing a flow of material between the jaws, spreading the edges of the strip to jaw shape and retaining a web of material between the jaws; selecting and maintaining in controlled relation the partially formed members; and removing, while under said control, the material retained between the jaws.

4. The method of forming interlocking members for separable fasteners having attaching jaws and interlocking devices at the opposite ends of the members, which consists in providing a strip of less width than the member with spread jaws; coining the jaw ends of the members forcing a flow of material between the jaws, spreading the edges of the strip to jaw shape and retaining a web of material between the jaws; treating said partially formed members to change some characteristic thereof; selecting and maintaining in controlled relation the partially formed members; and removing, while under said control, the material retained between the jaws.

5. The method of forming interlocking members for separable fasteners having attaching jaws at one end and interlocking devices at the opposite end, which consists in partially forming the member with a jaw end outlined to the shape of the jaws in spread relation, treating said partially formed members to change some surface characteristic thereof, selecting and maintaining in controlled relation the partially formed members, and removing, while under said control, the material bridging the space between the ends of the jaws.

6. The method of forming interlocking members for separable fasteners having attaching jaws and interlocking devices at the opposite ends of the members, which consists in providing a strip of less width than the member with spread jaws; coining the jaw ends of the members forcing a flow of material between the jaws; spreading the edges of the strip to jaw shape and retaining a web of material between the jaws; selecting and maintaining in controlled relation the partially formed members; and removing, while under said control, the material retained between the jaws and including with the material the material along the inner surfaces of the jaws.

7. The method of forming interlocking members for separable fasteners, each having attaching jaws at one end and interlocking devices at the opposite end, which consists in partially forming units comprising pairs of the members connected integrally at their jaw ends, selecting and maintaining in controlled relation the partially formed members, and severing the members, one from another, while under said control.

8. The method of forming interlocking members for separable fasteners, each having attaching jaws at one end and interlocking devices at the opposite end, which consists in partially forming members in pairs connected integrally at the jaw ends of the members and with the material bridging the space between the jaws, selecting and maintaining in controlled relation the partially formed member and while under said control removing the material between the jaws, and severing the members.

9. The method of forming interlocking members for separable fasteners, each having attaching jaws at one end and interlocking devices at the opposite end, which consists in partially forming pairs of members connected at their jaw ends from a strip of less width than the members with spread jaws; coining the strip between the jaws forcing a flow of material between the jaws, spreading the edges of the strip to a pair of jaw shapes, selecting and maintaining in controlled relation the partially formed members and while under said control severing the members and removing the material between the jaws.

10. The method of forming interlocking members for separable fasteners, each having attaching jaws at one end and interlocking devices at the opposite end, which consists in partially forming pairs of members connected at their jaw ends from a strip of less width than the members with spread jaws, coining the strip between the jaws forcing a flow of material between the jaws, spreading the edges of the strip to a pair of jaw shapes, selecting and maintaining in controlled relation the partially formed members and while under said control severing the members and removing the material between the jaws, including with the material removed the material along the inner surfaces of the jaws.

11. The method of forming interlocking members for separable fasteners, which consists in forming separate units of partially formed members with attaching jaws and with material bridging the space between the ends of the jaws, selecting and maintaining in controlled relation the units of partially formed members, removing by punching, while under said control, the material bridging the space between the ends of the jaws to complete the individual members, assembling and closing the jaws on a stringer.

12. The method of forming interlocking members for separable fasteners, which consists in partially forming the members with attaching jaws and with material bridging the space between the ends of the jaws and forming projections and recesses on the members, selecting and maintaining in controlled relation the partially formed members, removing by punching while under said control, the material bridging the space between the ends of the jaws, assembling and closing the jaws on a stringer.

13. The method of forming interlocking members for separable fasteners having attaching jaws at one end and interlocking devices at the opposite end which consists in providing a strip of less width than the member with spread jaws, and coining the jaw end of the member forcing a flow of material between the jaws spreading the edges of the strip to jaw shape.

14. The method of forming interlocking members for separable fasteners having attaching jaws at one end and interlocking devices at the opposite end, which consists in providing a blank of less width than the member with spread jaws, coining the jaw end of the member forcing a flow of material between the jaws, spreading the edges of the strip to jaw shape and retaining a web of material between the jaws.

15. The method of forming interlocking members for separable fasteners having attaching jaws at one end and interlocking devices at the opposite end, which consists in providing a blank of less width than the member with spread jaws, coining the jaw end of the member forcing a flow of material between the jaws, spreading the edges of the strip to jaw shape, retaining a web of material between the jaws and completing the jaws of the member by removing the web and the material along the inner surface of the jaws.

16. The method of forming interlocking members for separable fasteners each having attaching jaws at one end and interlocking devices at the opposite end, which consists in forming a blank for a unit comprising pair of members connected at their jaw ends forming recesses and projections on the ends of the blank, and severing the members.

17. The method of forming interlocking members for separable fasteners each having attaching jaws at one end and interlocking devices at the opposite end, which consists in forming a blank for a pair of members connected at their jaw ends and of less width than the members with the spread jaws, forming recesses and projections on the ends of the blank, coining the jaw portion of the blank forcing a flow of material between the jaws, spreading the edges of the blank to jaw shape, and severing the members.

18. The method of making fastener elements each having a pronged attaching portion which consists in forming a blank for a pair of elements, finishing the blank and removing a portion of the blank from between its ends to form a pair of pronged base portions with unfinished inner surfaces.

19. The method of making slide fasteners of the type having asymmetrical fastener elements clamped at intervals along the edge of a flexible supporting member which consists in forming generally flat blanks each of which is symmetrical in its principal plane with respect to a single point in that plane, assembling the blanks in an orderly arrangement, successively separating the blanks each into a pair of asymmetrical slide fastener elements while maintaining the elements in two series each uniformly spaced and in orderly arrangement, and clamping the elements to a pair of flexible supporting members.

20. The method of handling small elements the ratio of whose length and width is near unity which consists in forming a pair of elements into a single unit whose length materially exceeds its width, orienting a plurality of units with their lengths in the same direction, assembling the units into an orderly arrangement and subsequently separating the units into individual elements.

21. The method of making fastener elements each having a pronged attaching portion which consists in forming a unit including a pair of elements held together with their pronged attaching portions facing each other, smoothing the outside surfaces of the unit while leaving the inner surfaces of the prongs unfinished and subsequently separating the unit to form a pair of individual elements having smooth outer surfaces and rough inner prong surfaces.

22. The method of making fastener elements of the type having pronged portions which consists in preparing a blank containing a plurality of such elements connected by material disposed between the prongs, the outer edges of the completed elements being exposed in the blank, tumbling the blank for smoothing the outer corners and surfaces of the elements and removing the connecting material from between the prongs to form individual elements with unfinished inner surfaces on the prongs.

23. The method of making interlocking members for separable fasteners of the class described, such interlocking members having attaching jaws at one end and interlocking devices at the other end, which consists in forming fastener member units wherein substantially the entire outer surfaces are exposed while the inner surfaces of the jaws are covered throughout the length of said jaws, treating said units to change the outer surface characteristics, and then uncovering said inner jaw surfaces.

24. The method of making interlocking members for separable fasteners of the class described, such interlocking members having attaching jaws at one end and interlocking devices at the other end, which consists in forming fastener member units wherein substantially the entire outer surfaces are exposed while the inner surfaces of the jaws are covered throughout the length of said jaws, smoothing the outer surfaces of said unit while said inner jaw surfaces are covered, and then uncovering said inner jaw surfaces.

25. The method of forming slide fasteners of the type having pronged attaching portions adapted to straddle a stringer and free interlocking portions having interlocking recesses and projections on opposite sides thereof, which consists in forming exterior edges of a plurality of members with the major portion of said edges unobstructedly exposed and recesses and projections on opposite sides of each of said members and then separating one member from another.

26. The method of forming slide fasteners of the type having pronged attaching portions adapted to straddle a stringer and free interlocking portions having interlocking recesses and projections on opposite sides thereof, which consists in forming exterior edges of a plurality of members with the major portion of said edges unobstructedly exposed and recesses and projections on opposite sides of each of said members and then shaping at least partially the attaching prongs of one member and separating the same from another member.

27. The method of forming slide fasteners of the type having pronged attaching portions adapted to straddle a stringer and free interlocking portions having interlocking recesses and projections on opposite sides thereof, which consists in forming exterior edges of a plurality of members with the major portion of said edges unobstructedly exposed and recesses and projections on opposite sides of each of said members and then shaping at least partially the attaching prongs of one member and separating the same from another and bringing a formed member and a stringer together with the prongs astride the stringer.

28. The method of forming slide fasteners of the type having pronged attaching portions adapted to straddle a stringer and free interlocking portions having interlocking recesses and projections on opposite sides thereof, which consists in forming projections and recesses on opposite sides of each of a plurality of members, shaping prongs on said members with the major portion of the exterior edges of said members unobstructedly exposed, said prongs serving to unite the members and separating the attaching prongs of one member from another member.

29. The method of forming slide fasteners of the type having pronged attaching portions adapted to straddle a stringer and free interlocking portions having interlocking recesses and projections on opposite sides thereof, which consists in forming projections and recesses on opposite sides of each of a plurality of members, shaping prongs on said members with the major portion of the exterior edges of said members unobstructedly exposed, said prongs serving to unite the members and separating the attaching prongs of one member from another member, and bringing a formed member and a stringer together with the prongs astride the stringer.

30. The method of forming slide fasteners of the type having pronged attaching portions adapted to straddle a stringer and free interlocking portions having interlocking recesses and projections on opposite sides thereof, which consists in forming in the interlocking portions of each of the members a recess on one side and a projection on the opposite side, leaving the outer ends of the pronged portion of said members united end to end with another member and leaving the major portion of the exterior edges of the prong portions unobstructedly exposed and shaping the interior of and separating the attaching prongs.

31. The method of forming slide fasteners of the type having pronged attaching portions adapted to straddle a stringer and free interlocking portions having interlocking recesses and projections on opposite sides thereof, which consists in forming in the interlocking portions of each of the members a recess on one side and a projection on the opposite side, leaving the outer ends of the pronged portion of said members united end to end with another member and leaving the major portion of the exterior edges of the prong portions unobstructedly exposed and shaping the interior of and separating the attaching prongs and bringing a formed member and a stringer together with the prongs astride the stringer.

32. The method of forming slide fasteners of the type having pronged attaching portions adapted to straddle a stringer and free interlocking portions having interlocking recesses and projections on opposite sides thereof, which consists in forming in the interlocking portions of a plurality of united members a recess on one side and a projection on the opposite side of each member and attaching prongs with the major portion of the exterior edges thereof unobstructedly exposed and united at their outer ends to the succeeding member and separating said prongs from the adjacent member to separate one member from another.

33. The method of forming a group of fastener units of the type having pronged base portions adapted to straddle and secure a stringer with recesses and projections at the free ends of each unit, which consists in forming the exterior surfaces of a plurality of units with the major portion thereof unobstructedly exposed and the interior surfaces of the intermediate portions of the prongs less exposed than in the finished unit and severing the units one from another.

34. The method of forming separable fasteners which consists in forming a plurality of interlocking members each having a recess and projection, and also jaws on a blank with the members connected end to end and the connections between the members within the outer edges of the blank; and separating one member from another thus formed.

35. The method of forming separable fasteners which consists in forming a plurality of interlocking members each having a recess and projection, and also jaws on a blank with the members connected end to end and with integral connections between the members within the outer edges of the blank; and separating one member from another thus formed.

NOEL JOSEPH POUX.